Figure 1:
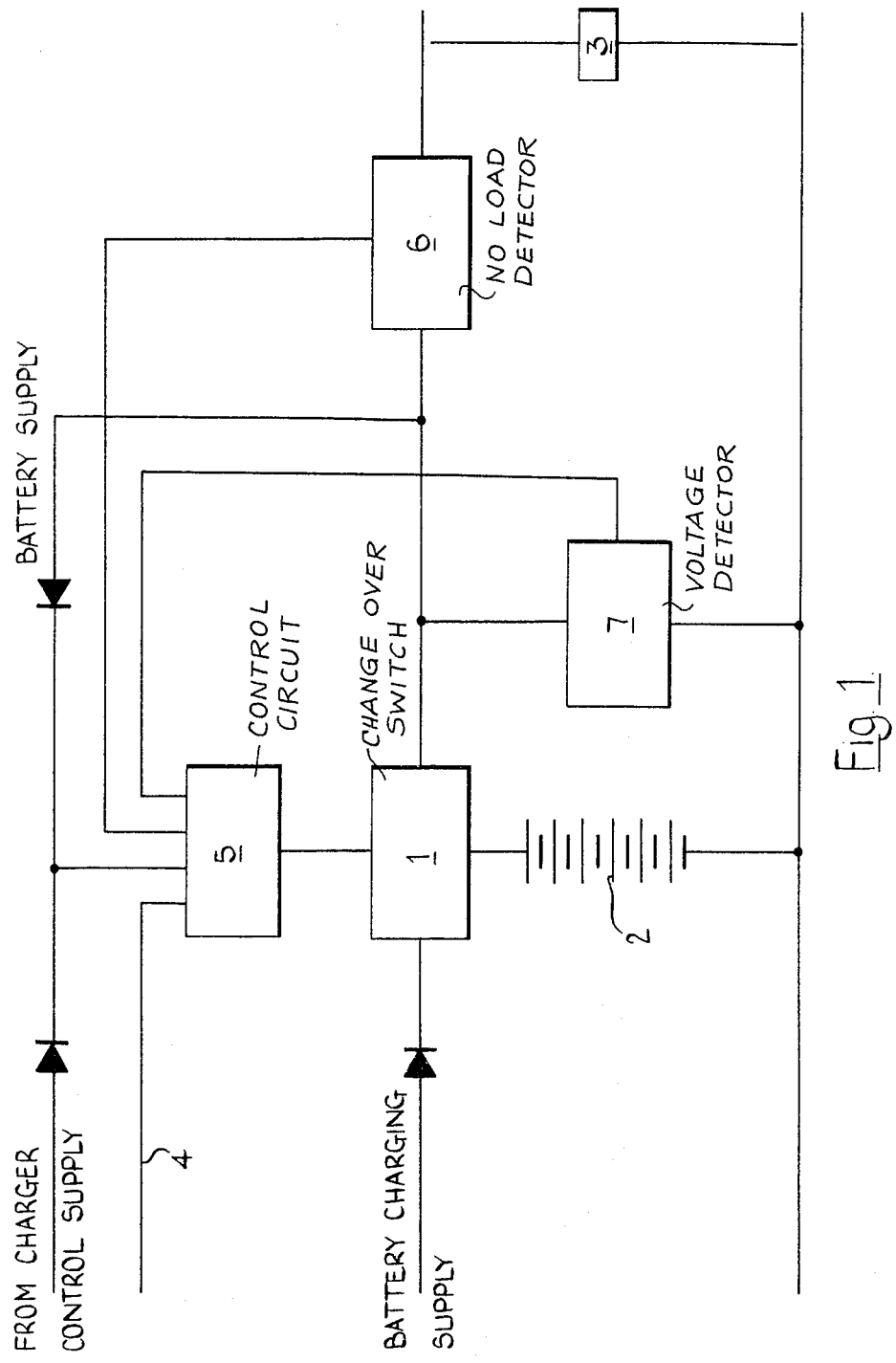

United States Patent [19]

Jurgens et al.

[11] 4,237,385

[45] Dec. 2, 1980

[54] CONTROL OF POWER SUPPLY

[75] Inventors: Gunter R. Jurgens, Collaroy Beach; Mohammed A. Helal, Harbord, both of Australia

[73] Assignee: Minitronics Pty, Ltd., Australia

[21] Appl. No.: 957,065

[22] Filed: Nov. 3, 1978

[30] Foreign Application Priority Data

Nov. 4, 1977 [AU] Australia .............................. PD2307

[51] Int. Cl.³ .......................... H02J 7/00; H02J 9/00
[52] U.S. Cl. ........................................ 307/66; 320/13
[58] Field of Search ...................... 307/66, 46; 320/15, 320/13, 40

[56] References Cited

U.S. PATENT DOCUMENTS 3,683,198  8/1972  Thode .................................... 307/66
3,721,887  3/1973  Nickerson ......................... 307/66 X
3,939,359  2/1976  Nehushtan et al. .................... 307/66

Primary Examiner—Robert J. Hickey
Attorney, Agent, or Firm—Steinberg & Blake

[57] ABSTRACT

A power supply control system suitable for controlling and protecting batteries used in such systems by causing the automatic disconnection of the battery from a load when either the battery voltage has dropped to a preset level or when the load has open circuited. Disconnection of the load ensures that the battery does not undergo any further discharge (except self discharge) and the load can only be reconnected to the battery when a main supply (charging means) is reapplied and removed again or by use of additional circuitry from an external switch, and then only when load is present and battery voltage is above the preset level.

4 Claims, 2 Drawing Figures

CONTROL OF POWER SUPPLY

The present invention relates to a method and apparatus for controlling a power supply in association with a mains supply. In particular, the invention is applicable to automatically protecting such as an installed or stored single point self contained emergency lighting system having no power connected, until such time as mains power becomes connected and readies the system for use. It will be understood that other applications where there is a battery emergency system will be suited to the present invention which can be employed at the battery itself or remotely at any individual load which is to be operated under emergency battery power.

In one form, the present invention provides a control system for a power supply comprising a battery connected to a controlled change over switch which connects said battery charging means, when a mains supply is operative in association with said change over switch, or to a load to be supplied with battery power when said mains supply fails after having been operatively connected and wherein the battery voltage, during discharge, through the load, has fallen to a predetermined value, a battery voltage detector generates a signal operative to effect switching of said change over switch to disconnect said battery from said load. Preferably, the change over switch disconnects the battery from the load and connects the battery to the battery charging means.

In a preferred form, there is provided a no load detector which generates a signal operative to effect switching of the change over switch to connect the battery to the battery charging means when the load is removed.

In another form the present invention provides a control system for a power supply comprising a battery connected to a controlled battery change over switch to battery charging means, when a mains supply is operative in association with said change over switch, or to a load to be supplied with battery power when said mains supply fails after having been operatively connected, and wherein there is provided a no load detector which generates a signal operative to effect switching of said change over switch to disconnect said battery from said load when a no load condition is detected after said battery is connected to said load.

In the case of a centralised emergency battery system where a control system of the invention is located at the load, or somewhere in between, loss of local mains supply can be used to trigger the system into operation instead of loss of mains supply at the battery location.

The control system of the invention is applicable to all rechargeable battery applications and reduces inadvertent abuse of battery during discharge giving rise to premature battery failure.

The invention will now be described by way of example with reference to the accompanying drawings, in which :-

Figure 2:
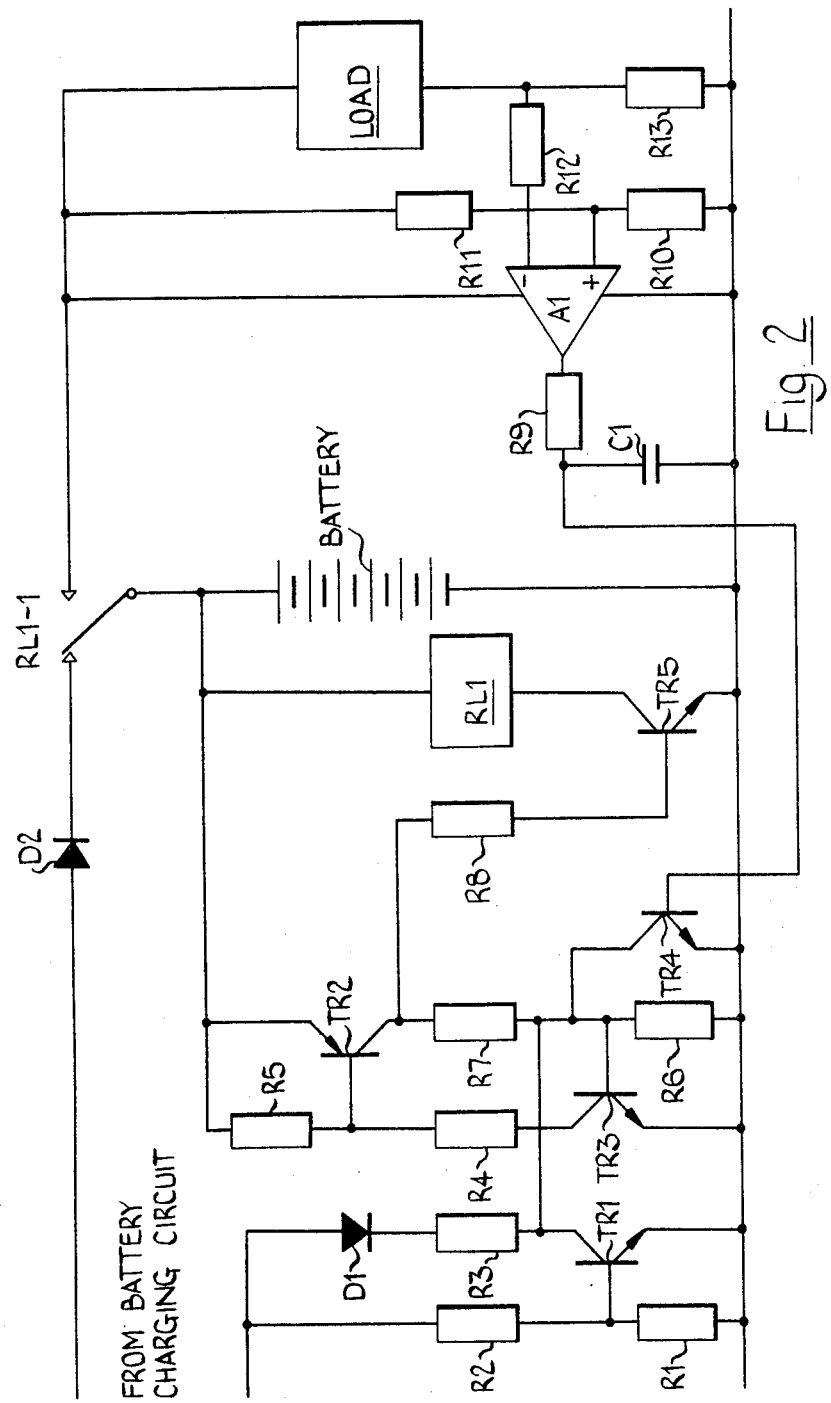

FIG. 1 is a block diagram of a system in accordance with the present invention; and FIG. 2 is a detailed circuit diagram of an embodiment of the present invention.

The battery change over switch 1 controls the connection of the battery 2 to the charger (not shown) or the load 3. The battery 3 can only be connected to the charger (not shown) or the load 3 at any one time, and not to both at the same time.

With normal mains supply healthy and connected, the battery 2 is automatically connected to the charging circuit via the battery change over switch 1. Supply to the control circuit for the change over switch is derived from the normal mains supply or the charging supply. This supply is stored for a short period of time to allow the supply to change over to battery supply on mains supply failure.

On failure of the mains supply (also normal disconnection of supply during demonstration or test) a signal 4 is sent from the mains failure detector (not shown) to the control circuit 5 for change over switch 1 which connects the load to the battery 2 and supplies power to the change over switch control circuit.

Once the change over switch has been connected to the load, it will remain connected until :

(a) the load is removed as determined by a no load detector 6, or
(b) the battery voltage, during discharge, has fallen to a predetermined value such as where one or more of the cells making up the battery will be driven into reverse polarity should further discharge continue. The battery voltage being detected by detector 7.

Once one of the above has occurred, a signal will be sent to the control circuit 5 for the battery change over switch 1 which will connect the battery to the charger. When this happens, the control circuit 5 for the change over switch 1 becomes de-energized as no normal mains supply is available and the battery remains connected to the "dead" charging supply. The battery change over switch 1 will remain dormant until normal mains power is reconnected and another failure or simulated failure occurs.

Referring now to the circuit diagram of FIG. 2, it can be seen that resistors R1, R2 and R3, transistor TR1 and diode D1 forms the Mains Failure Detector.

That part of the circuit comprising resistors R4, R5, R6 and R7, transistors TR2 and TR3 forms the Low Battery Voltage Detector, and when used in conjunction with resistor R8 and transistor TR5 forms the control for Change Over Switch relay RL1.

That part of the circuit including resistors R9, R10, R11, R12 and R13, capacitor C1, amplifier A1 and transistor TR4 forms the No Load Detector Circuit.

When the charging means has been energized (i.e. mains supply present) transistor TR1 is biased in the ON state by resistors R1 and R2. Resistor R3 limits collector current to transistor TR1. With transistor TR1 in the ON state, the collector voltage of transistor TR1 is near zero potential and biases transistor TR3 OFF. When transistor TR3 is OFF, no bias is provided for transistors TR2 and TR5 which remain OFF and relay RL1 remains deenergized with its contact as shown in FIG. 2.

On mains supply failure, i.e. loss of charging means, the supply voltage to Mains Failure Detector circuit falls to zero. As it is falling to zero, transistor TR1 will switch OFF well before the voltage reaches zero at a level determined by the biasing resistor ratio of R1 to R2 which under normal mains supply biases transistor TR1 ON. As transistor TR1 is switched OFF before the supply voltage falls to zero, transistor TR3 will be biased ON momentarily by means of resistors R3 and R6. With transistor TR3 biased ON, the collector current of transistors TR3 will bias ON transistor TR2 by means of resistors R4 and R5 and its collector current will in turn maintain a bias on transistor TR3 by means of resistors R7 and R6. Even though now the supply to the Mains Failure Detector circuit has fallen to zero volts, the Low Battery Voltage Detector circuit has been energized and draws its supply from the battery.

With the energizing of the Low Battery Voltage Detector circuit transistor TR5 is biased ON by means of resistor R8 which in turn energizes relay RL1 and its contact RL1-1 changes the battery from the charging mode to the discharging mode, i.e. the load is connected. With the battery connected to the load, the NO LOAD DETECTION circuit becomes energized. Resistor R9 and capacitor C1 act as a short time delay for switching transistor TR4 so as to allow amplifier A1 to settle and prevent inadventent operation of transistor TR4 during relay contact RL1-1 change over to load and thus prevent de-energizing of Low Battery Level Detector circuit.

As the battery current passes through the load, it also passes through the load current sense resistor R13. The voltage across the sense resistor R13 is measured by amplifier A1 through resistor R12 and compared with a reference voltage determined by resistor divider R10 and R11. With load connected the voltage across load current sense resistor R13 is greater than the voltage determined by resistor divider R10 and R11. This in turn will cause the output at the amplifier A1 to be zero volts which means transistor TR4 is biased OFF.

With no load present, the voltage across load current sense resistor is zero volts which is less than that determined by resistor divider network R10 and R11, which in turn will cause the output of amplifier A1 to go to a high voltage level which will bias ON transistor TR4 by means of R9. When transistor TR4 is biased ON, its collector will be at zero potential which will remove the bias of transistor TR3 and switch it OFF, with no collector current for transistor TR3 bias is removed from transistor TR2 causing it to switch OFF. This leaves the Low Battery Voltage Detector circuit de-energized and remain de-energized.

With the Low Battery Voltage Detector circuit deenergized, bias is removed from transistor TR5 which switches OFF and relay RL1 is de-energized and its contact RL1-1 changes back to the charging mode. The battery can discharge no further, as circuits are de-energized and diode D2 prevents discharge back into the charger.

If the load was present and Low Battery Voltage Detector circuit was energized, resistors R5 and R4 provide bias for transistor TR2 and resistors R6 and R7 provide bias for transistor TR3. The ratio of resistors R5 to R4 is equal to the ratio of resistors R6 to R7 and generally resistor R5 equals R6 and resistor R4 equals R7. The ratio at the resistors are so chosen that when battery voltage falls to a certain level, the resistor R5, R4 and R6, R7 can no longer provide a switch ON bias for transistors TR2 and TR3, respectively, and as each transistor relies on the ON condition of the other for its bias, the Low Battery Voltage Detector circuit becomes de-energized which in turn removes bias from transistor TR5 which switches OFF and relay RL1 de-energizes returning its contact back to the charging mode.

Once the circuits controlled by the battery have been de-energized, they cannot be brought back into operation until the mains supply is reconnected (charging means applied) and then removed again.

The use of this system permits the complete installation of single point, self contained emergency lighting systems without normal mains supply being available, and it enables systems to be checked out before commissioning as the connection and disconnection of normal mains supply does not have a detrimental effect on the emergency system.

As this form of protection is automatic, no special linking wires are required to be connected before activating or deactivating the system as shown, nor are switches requird. The present invention makes emergency systems much more fool-proof, because it eliminates human error when it comes to installation of such systems.

We claim:

1. A control system for a power supply comprising a controlled battery change over switch, a battery connected to said controlled battery change over switch which connects said battery to battery charging means, when a mains supply is operative in association with said change over switch, or to a load to be supplied with battery power when said mains supply fails after having been operatively connected, and wherein when the battery voltage, during discharge through the load, has fallen to a predetermined value, a battery voltage detector generates a signal operative to effect switching of said change over switch to disconnect said battery from said load and connect said battery to the charging means.

2. A control system as claimed in claim 1, further comprising a no load detector which generates a signal operative to effect switching of the change over switch to disconnect the battery when the load is removed after said battery is connected to said load.

3. A control system as claimed in claim 2, wherein operation of said no load detector connects the battery to said battery charging means when the load is removed.

4. A control system for a power supply as claimed in claim 1 wherein discharge of the battery through the load after the battery has been connected to the charging means is effected only upon reapplication and subsequent disconnection of said mains supply.

* * * * *